(12) United States Patent
Chunduri et al.

(10) Patent No.: US 10,305,790 B2
(45) Date of Patent: May 28, 2019

(54) METHOD AND APPARATUS FOR PSEUDOWIRE (PW) SETUP AND MAINTENANCE USING OSPF PROTOCOL

(71) Applicant: Futurewei Technologies, Inc., Plano, TX (US)

(72) Inventors: Uma S. Chunduri, Fremont, CA (US); Evgeny Tantsura, Palo Alto, CA (US)

(73) Assignee: Futurewei Technologies, Inc., Plano, TX (US)

(*) Notice: Subject to any disclaimer, the term of this patent is extended or adjusted under 35 U.S.C. 154(b) by 84 days.

(21) Appl. No.: 15/481,271

(22) Filed: Apr. 6, 2017

(65) Prior Publication Data

US 2018/0295054 A1 Oct. 11, 2018

(51) Int. Cl.

| H04L 12/723 | (2013.01) |
|---|---|
| H04L 12/721 | (2013.01) |
| H04L 12/775 | (2013.01) |
| H04L 12/741 | (2013.01) |
| H04L 29/12 | (2006.01) |

(52) U.S. Cl.
CPC ............ *H04L 45/50* (2013.01); *H04L 45/26* (2013.01); *H04L 45/58* (2013.01); *H04L 45/74* (2013.01); *H04L 61/2007* (2013.01)

(58) Field of Classification Search
CPC ......... H04L 45/50; H04L 45/74; H04L 45/26; H04L 45/58; H04L 61/2007
See application file for complete search history.

(56) References Cited

U.S. PATENT DOCUMENTS

| 2006/0291445 A1 | 12/2006 | Martini et al. |
| 2008/0225864 A1 | 9/2008 | Aissaoui et al. |
| 2010/0023632 A1* | 1/2010 | Liu ............... H04L 12/4633 709/230 |
| 2013/0258871 A1* | 10/2013 | Dutta ............... H04L 45/16 370/252 |
| 2013/0308945 A1* | 11/2013 | Dhillon ............ H04Q 11/0003 398/48 |
| 2015/0200842 A1 | 7/2015 | Wang et al. |

FOREIGN PATENT DOCUMENTS

| CN | 103004147 A | 3/2013 |
| WO | 2017168218 A1 | 10/2017 |

OTHER PUBLICATIONS

Lindem et al., "OSPFv3 LSA Extendibility", Oct. 21, 2016, IETF, pp. 1-37 (Year: 2016).*
Filsfils, C., Ed, et al., "Segment Routing Architecture," draft-ietf-spring-segment-routing-10, Nov. 19, 2016, 29 pages.
Alvestrand, H., "IETF Policy on Character Sets and Languages," RFC 2277, Jan. 1998, 9 pages.
Moy, J., "OSPF Version 2," RFC 2328, Apr. 1998, 244 pages.
(Continued)

*Primary Examiner* — Feben Haile
(74) *Attorney, Agent, or Firm* — Conley Rose, P.C.

(57) ABSTRACT

A provider edge (PE) router and methods for establishing a pseudowire using open shortest path first (OSPF) link state advertisement (LSA) messages. The pseudowire links the PE router with a remote PE router through a packet switched network (PSN), and emulates other communications protocols to provide customer edge (CE) equipment connected to the PE routers the appearance of a dedicated private circuit.

16 Claims, 8 Drawing Sheets

(56) References Cited

OTHER PUBLICATIONS

Rosen, E, et al., "Multiprotocol Label Switching Architecture," RFC 3031, Jan. 2001, 61 pages.
Bryant, S., Ed., et al., "Pseudo Wire Emulation Edge-to-Edge (PWE3) Architecture," RFC 3985, Mar. 2005, 42 pages.
Martini, L., "IANA Allocation for Pseudowire Edge to Edge Emulation (PWE3)," RFC 4446, Apr. 2006, 9 pages.
Martini, L., Ed., et al., "Pseudowire Setup and Maintenance," RFC 4447, Apr. 2006, 33 pages.
Kompella, K., Ed., et al., "Virtual Private LAN Service (VPLS) Using BGP for Auto-Discovery and Signaling," RFC 4761, Jan. 2007, 28 pages.
Lindem, A., Ed., et al., "Extensions to OSPF for Advertising Optional Router Capabilities," RFC 4970, Jul. 2007, 13 pages.
Andersson, L., Ed., et al., "LDP Specification," RFC 5036, Oct. 2007, 135 pages.
Coltun, R., et al., "OSPF for IPv6," RFC 5340, Jul. 2008, 94 pages.
Rosen, E., et al., "Provisioning, Auto-Discovery, and Signaling in Layer 2 Virtual Private Networks (L2VNPs)," RFC 6074, Jan. 2011, 32 pages.
Psenak, P., et al., "OSPFv2 Prefix/Link Attribute Advertisement," RFC 7684, Nov. 2015, 15 pages.
Lindem, A., Ed., et al., "Extensions to OSPF for Advertising Optional Router Capabilities," RFC 7770, Feb. 2016, 15 pages.
"Pseudowire Name Spaces (PWE3)," https://www.iana.org/assignments/pwe3-parameters/pwe3-parameters.xhtml, Feb. 3, 2017, 11 pages.
Bocci, M., et al., "OSPF Extensions for Dynamic Multi-segment Pseudo Wires," draft-dolganow-pwe3-ospf-ms-pw-ext-02.txt. Feb. 4, 2008, 15 pages.
Foreign Communication From a Counterpart Application, PCT Application No. PCT/CN2018/081387, English Translation of International Search Report dated Jun. 14, 2018, 5 pages.
Foreign Communication From a Counterpart Application, PCT Application No. PCT/CN2018/081387, English Translation of Written Opinion dated Jun. 14, 2018, 6 pages.

\* cited by examiner

METHOD AND APPARATUS FOR PSEUDOWIRE (PW) SETUP AND MAINTENANCE USING OSPF PROTOCOL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A "pseudowire" ("PW") is a mechanism for emulating various networking and telecommunications services across a packet-switched network (PSN). Pseudowire can be used, for example, to emulate synchronous optical networking (SONET), synchronous digital hierarchy (SDH), time-division multiplexing (TDM), structure-agnostic TDM over packet (SAToP), frame relay, asynchronous transfer mode (ATM), Ethernet over multi-protocol label switching (MPLS), and other protocols and services.

In conventional pseudowire systems, the pseudowire is configured using the targeted label distribution protocol (tLDP) or the border gateway protocol (BGP). However, using these protocols is problematic and in some cases unnecessary (especially when using certain technologies, for example, Segment Routing, where LDP is not used at all). For example, conventional pseudowire systems require one protocol for the control plane and another protocol for the data plane. Further, route processor switchover convergence time (RP SWO) in high available (HA) systems is significantly higher when using LDP rather than the embodiments of the present disclosure. Further, for in-service software upgrades (ISSUs), the pseudowire will disconnect because the line card black-out time is longer than the LDP session outage detection time. Further, BGP is not always available for use with pseudowire because of operational complexity and cost.

What is needed, therefore, is a pseudowire setup and maintenance mechanism that avoids these problems and others associated with conventional pseudowire configurations.

SUMMARY

The embodiments of this disclosure are directed at mechanisms to signal and maintain pseudowires in an open shortest path first (OSPF) domain, thus simplifying the network design for layer two virtual private network (L2VPN) services in segment routing deployments.

In a first embodiment, an originating local provider edge (PE) router communicates over a pseudowire by creating a first open shortest path first (OSPF) link state advertisement (LSA), the first OSPF LSA comprises a pseudowire capability type-length-value (TLV) element, sending the first OSPF LSA to a remote PE router via a packet switched network (PSN), receiving a second OSPF LSA from the remote PE router via the PSN, the second OSPF LSA comprises a pseudowire capability TLV element, creating a third OSPF LSA, the third OSPF LSA comprises a pseudowire association TLV element, sending the third OSPF LSA to the remote PE router via the PSN, receiving a fourth OSPF LSA from the remote PE router via the PSN, the fourth OSPF LSA comprising a pseudowire association TLV element, and establishing a pseudowire connection with the remote PE router via the PSN according to the pseudowire association TLV element of the third OSPF LSA.

In a variation of the first embodiment, sending the first OSPF LSA comprises flooding the first OSPF LSA to a plurality of routers in the PSN, sending the third OSPF LSA comprises flooding the third OSPF LSA to the plurality of routers in the PSN, and the remote PE router is one of the plurality of routers in the PSN.

In another variation of the first embodiment, the pseudowire capability TLV element of the first OSPF LSA comprises an indication that the local PE router supports pseudowires and the pseudowire capability TLV element of the second OSPF LSA comprises an indication that the remote PE router supports pseudowires. Further, the first OSPF LSA and the second OSPF LSA may be router information opaque LSAs or they may be are router information LSAs.

In another variation of the first embodiment, the third OSPF LSA and the fourth OSPF LSA are extended prefix LSAs, or they may be one of E-Intra-Area-Prefix-LSAs, E-Inter-Area-Prefix-LSAs, E-AS-External-LSAs, and E-Type-7-LSAs.

In another variation of the first embodiment, the pseudowire association TLV element of the third OSPF LSA comprises an internet protocol (IP) address associated with the local PE router, an IP address associated with the remote PE router, and a pseudowire sub-TLV comprising a pseudowire type, a pseudowire identifier, a pseudowire label, and a seen (S) bit, wherein the value of the S bit is 0. Further, the pseudowire association TLV element of the fourth OSPF LSA may comprise the IP address associated with the local PE router, the IP address associated with the remote PE router, and a pseudowire sub-TLV comprising the pseudowire type, the pseudowire identifier, the pseudowire label, and an S bit, wherein the value of the S bit is 1. This variation may further comprise creating a fifth OSPF LSA, the fifth OSPF LSA comprises a pseudowire association TLV element and the pseudowire association TLV element of the fifth OSPF LSA comprises the IP address associated with the local PE router, the IP address associated with the remote PE router, and a pseudowire sub-TLV comprising the pseudowire type, the pseudowire identifier, the pseudowire label, and an S bit, wherein the value of the S bit is 1, and sending the fifth OSPF LSA to the remote PE router via the packet switched network. This variation may further comprise, after receipt of the fourth OSPF LSA, adding the pseudowire label to a label forwarding information base (LFIB) to associate the pseudowire label with a customer edge (CE) router. This variation may further comprise, after establishing the pseudowire connection with the remote PE router, receiving a first data packet from the remote PE router via the packet switched network, the first data packet comprises the pseudowire label and a first payload, searching the LFIB to locate the CE router associated with the pseudowire label, and forwarding the first payload to the CE router associated with the pseudowire label. This variation may further comprise, after establishing the pseudowire connection with the remote PE router, receiving a second payload from the CE router, searching the LFIB to locate the pseudowire label associated with the CE router, prepending the pseudowire label to the second payload to form a second data packet, and sending the second data packet to the remote PE router via the packet switched network.

In a second embodiment, a non-originating local PE router communicates over a pseudowire by receiving a first open shortest path first (OSPF) link state advertisement (LSA) from a remote PE router via a packet switched network (PSN), the first OSPF LSA comprising a pseudowire association type-length-value (TLV) element, creating a second OSPF LSA, the second OSPF LSA comprises a pseudowire association TLV element, flooding the second OSPF LSA to a plurality of routers in the PSN, the remote PE router is one of the plurality of routers in the PSN, and establishing a pseudowire connection with the remote PE router via the PSN according to the pseudowire association TLV element of the first OSPF LSA In another variation of the second embodiment, the pseudowire association TLV element of the first OSPF LSA comprises an internet protocol (IP) address associated with the local PE router, an IP address associated with the remote PE router, and a pseudowire sub-TLV comprising a pseudowire type, a pseudowire identifier, and a pseudowire label, and the pseudowire association TLV element of the second OSPF LSA comprises the internet protocol (IP) address associated with the local PE router, the IP address associated with the remote PE router, and the pseudowire sub-TLV comprising the pseudowire type, the pseudowire identifier, the pseudowire label, and a seen (S) bit, wherein the value of the S bit is 1. This variation may further comprise, after flooding the second OSPF LSA to the plurality of routers, adding the pseudowire label to a label forwarding information base (LFIB) to associate the pseudowire label with a customer edge (CE) router.

In a third embodiment, a PE router comprises a first network interface configured to communicate with a customer edge (CE) router, a second network interface configured to communicate with a packet switched network (PSN), a memory configured to store a label forwarding information base (LFIB), a processor coupled with the first network interface, the second network interface, and the memory, and the processor is configured to create a first open shortest path first (OSPF) link state advertisement (LSA), the first OSPF LSA comprises a pseudowire capability type-length-value (TLV) element, send the first OSPF LSA to a remote PE router via the second network interface, receive a second OSPF LSA from the remote PE router via the second network interface, the second OSPF LSA comprises a pseudowire capability TLV element, create a third OSPF LSA, the third OSPF LSA comprises a pseudowire association TLV element, send the third OSPF LSA to the remote PE router via the second network interface, receive a fourth OSPF LSA from the remote PE router via the second network interface, the fourth OSPF LSA comprising a pseudowire association TLV element, and establish a pseudowire connection with the remote PE router via the second network interface according to the pseudowire association TLV element of the third OSPF LSA.

In a variation of the third embodiment, the pseudowire association TLV element of the third OSPF LSA comprises an internet protocol (IP) address associated with the local PE router, an IP address associated with the remote PE router, and a pseudowire sub-TLV comprising a pseudowire type, a pseudowire identifier, a pseudowire label, and a seen (S) bit, wherein the value of the S bit is 0, and the pseudowire association TLV element of the fourth OSPF LSA comprises, the internet protocol (IP) address associated with the local PE router, the IP address associated with the remote PE router, and the pseudowire sub-TLV comprising the pseudowire type, the pseudowire identifier, the pseudowire label, and a S bit, wherein the value of the S bit is 1. In this variation, the processor may be further configured to add the pseudowire label to the LFIB to associate the pseudowire label with the CE router, receive a data packet from the remote PE router via the second network interface, the packet comprises the pseudowire label and a payload, search the LFIB to locate the CE router associated with the pseudowire label, and forward the payload to the CE router associated with the pseudowire label via the first network interface.

In another variation of the third embodiment, sending the first OSPF LSA comprises flooding the first OSPF LSA to a plurality of routers in the PSN via the second network interface, sending the third OSPF LSA comprises flooding the third OSPF LSA to the plurality of routers in the PSN via the second network interface, and the remote PE router is one of the plurality of routers in the PSN.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the embodiments of this disclosure, use of label distribution protocol (LDP) and resource reservation protocol (RSVP) is replaced with interior gateway protocols (IGPs) open shortest path first (OSPF) and intermediate system to intermediate system (IS-IS) for distributing labels for transport of virtual private network (VPN) services. This is achieved by using segment identifiers (SIDs), which are unique indices in an OSPF area/domain and can be seen as equivalent to multi-protocol label switching (MPLS) labels.

Figure 1:
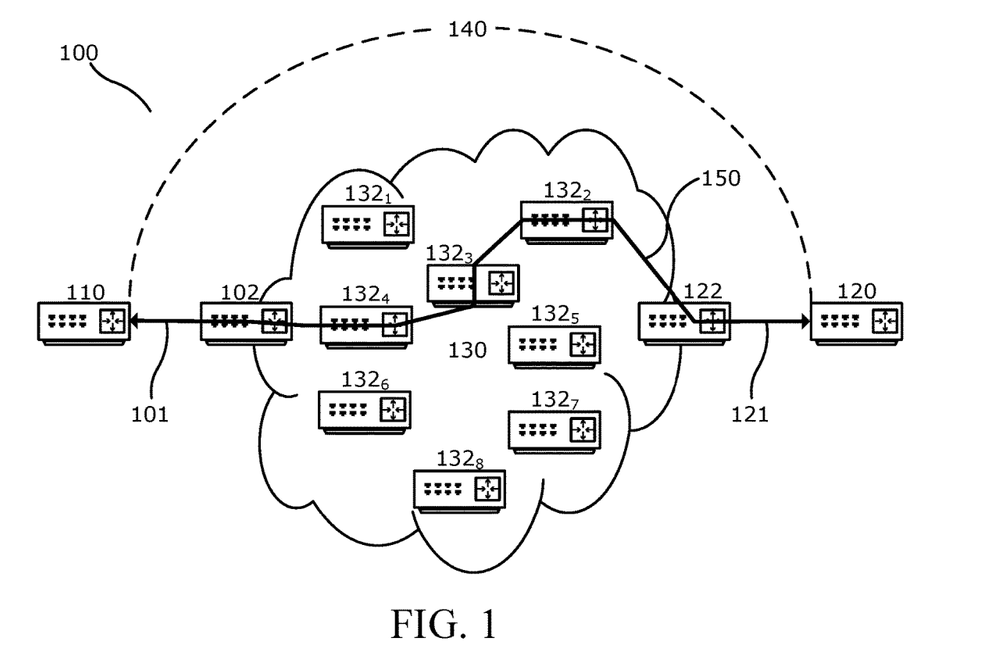
FIG. 1 shows a pseudowire in the context of a packet switch network.

FIG. 1 shows a network configuration 100 which is suitable for implementing a pseudowire between CE routers 110 and 120 using an embodiment of the present disclosure. From the customer's perspective, CE routers 110 and 120 are directly connected over a dedicated private circuit 140. However, in this example, a message sent from CE router 110 to CE router 120 follows pathway 150, which runs through attachment circuit 101 to service provider edge (PE) router 102, through switching routers (SRs) $132_4$, $132_3$, and $132_2$ in PSN 130, through PE router 122 and attachment circuit 121, before reaching CE router 120. Note that the physical pathway for another message sent from CE router 110 to CE router 120 may include the same SRs $132_n$ or different SRs $132_n$.

Each packet traveling through the PSN has a header and payload. The header contains address information used to route the packet through the PSN, while the payload is the actual information to be transmitted, for example user data and control data. When an SR $132_n$ receives a packet, it forwards the packet to another SR $132_n$ according to the header. In an MPLS PSN, labels identify virtual links (paths) between switching routers SR $132_n$, and the header of a packet traveling through a MPLS PSN includes at least one label. When a packet arrives at an SR $132_n$, SR $132_n$ examines the label and forwards the packet to the next SR $132_n$ according to the label.

In embodiments of the present disclosure, setting up and using a pseudowire over pathway 150 requires agreement on the format and contents of messages sent between PE routers 102 and 122. However, the switch routers SR $132_n$ along pathway 150 need not be aware of the pseudowire-specific contents of the messages; from the perspective of switch routers SR $132_n$, the messages may be formatted using known OSPF constructs. Thus, embodiments of the present disclosure require a set of parameters for use with OSPF type-length-value (TLV) elements and sub-TLV elements in link state advertisements (LSAs).

The following paragraphs define TLVs and sub-TLVs for use with one embodiment of the present disclosure. As one of ordinary skill will understand, the exact format and content of any given TLV or sub-TLV is subject to industry review and agreement, and as such, the TLVs and sub-TLVs described here are examples only. The embodiments of the disclosure could be implemented with variation on the TLVs and sub-TLVs described here without departing from the spirit of the disclosure. Further, as one of ordinary skill will understand, type and sub-type fields are assigned by the Internet Assigned Numbers Authority (IANA), and as such, for the purposes of this disclosure, the type and sub-type fields in the following TLVs and sub-TLVs are listed simply as "to-be-determined" ("TBD"). Finally, as one of ordinary skill will understand, there are currently two versions of OSPF, version 2 (OSPFv2), which is defined by Request for Comments (RFC) 2328 and version 3 (OSPFv3), which is defined by RFC 5340. The descriptions here reflect both versions. Should a new version of OSPF be developed, the versions of the TLVs and sub-TLVs described here could be modified without departing from the spirit of the disclosure.

Figure 2:
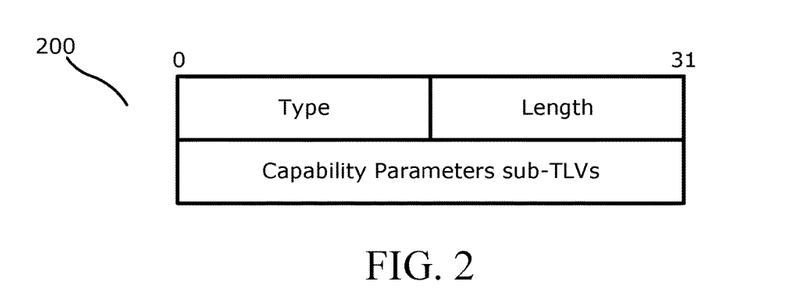
FIG. 2 shows the format of the Pseudowire Capability type-length-value (TLV).
Figure 3:
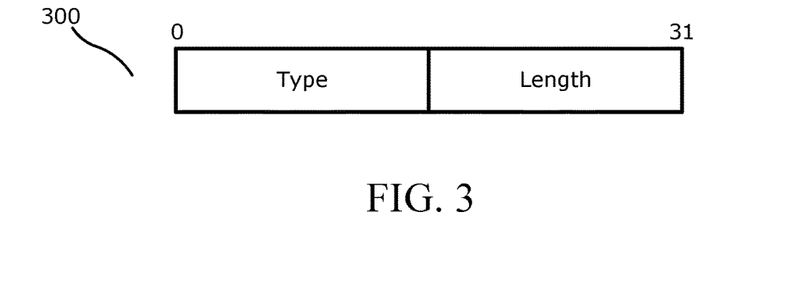
FIG. 3 shows the format for the Pseudowire Capability sub-TLV.

Pseudowire Capability TLV. For OSPFv2, the Pseudowire Capability TLV advertises pseudowire capabilities supported by the node in the Router Information Opaque LSA (defined in RFC 7770). For OSPFv3, the Pseudowire Capability TLV advertises pseudowire capabilities supported by the node in the Router Information LSA (defined in RFC 4970). FIG. 2 shows the format of Pseudowire Capability TLV 200, where Type is to-be-determined, Length is the number of bytes of the Capability Parameters Sub-TLVs, the Capability Parameters Sub-TLVs each consists of a sequence of 1 byte of capability type (new registry for the capabilities), 1 byte of length of the value field of the capability, and 0-243 bytes of value of capability (if any). There should be at least one Capability Parameters Sub-TLV. Additional capability TLVs can be sent after the initial set and the absence of a particular capability is an indication that the capability is not supported or has been withdrawn. FIG. 3 shows the format for corresponding sub-TLV 300, where Type is to-be-determined and Length is the number of bytes in the remainder of the sub-TLV and will always be 0.

Figure 4:
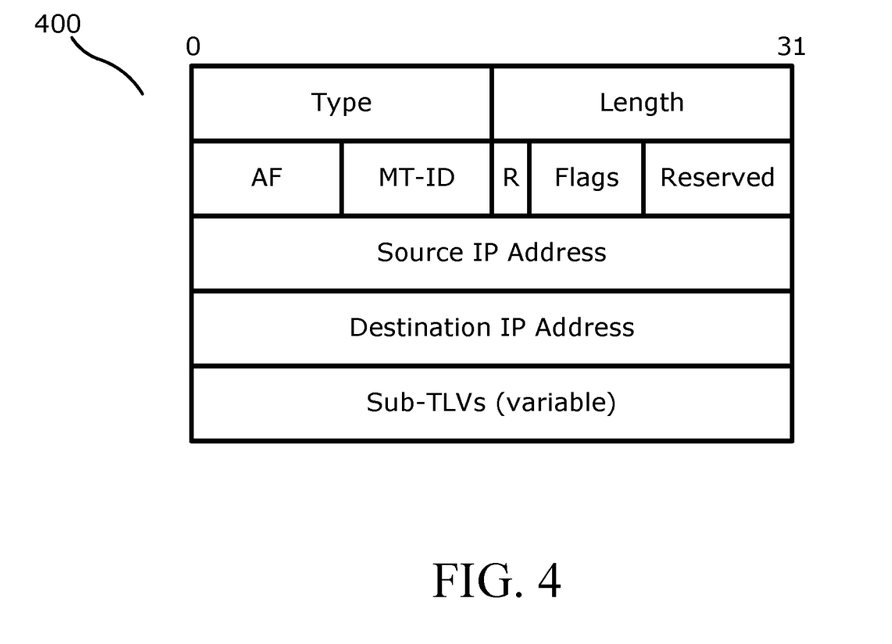
FIG. 4 shows the format for the OSPFv2 Pseudowire Association TLV.

Pseudowire Association TLV. For OSPFv2, the Pseudowire Association TLV advertises pseudowire association with the applicable sub-TLVs to represent the pseudowire, and is advertised as a new top level TLV of the Extended Prefix LSA (defined in RFC 7684). Multiple Pseudowire Association TLVs may be advertised in each OSPF Extended Prefix Opaque LSA, but all prefix ranges included in a single OSPF Extended Prefix Opaque LSA should have the same flooding scope. The Pseudowire Association TLV should have at least one sub-TLV otherwise it will be ignored on receipt. The Pseudowire Association TLV may appear any number of times (including none) within an LSA. FIG. 4 shows the format for OSPFv2 Pseudowire Association TLV 400, where Type is to-be-determined, Length is the number of bytes in the remainder of the TLV, AF is the Address Family and is 0 (IPv4 Unicast), MT-ID is the Multi-topology Identifier (as defined in RFC 4915), R is the re-advertisement flag (the remainder should be set to 0 and are ignored) and is set when this TLV has been leaked from one level to another (upwards or downwards), and if bit 0 is set then it should not be leaked further, Flags (bits 1-7) should be sent as 0 and are ignored upon receipt, Reserved should be reset on transmission and ignored on reception (reserved for future use), Source IP Address is the 32-bit IPv4 pseudowire association originator internet protocol (IP) address in network byte order (generally one of the loopback interface IP address of the originating router), Destination IP Address is the 32-bit IPv4 pseudowire association originator address in NBO (generally one of the loopback interface IP address of the destination router), and Sub-TLVs consisting of a two-byte sub-TLV type (requiring a new registry for this TLV) and a two-byte length of the remainder of the sub-TLV.

Figure 5:
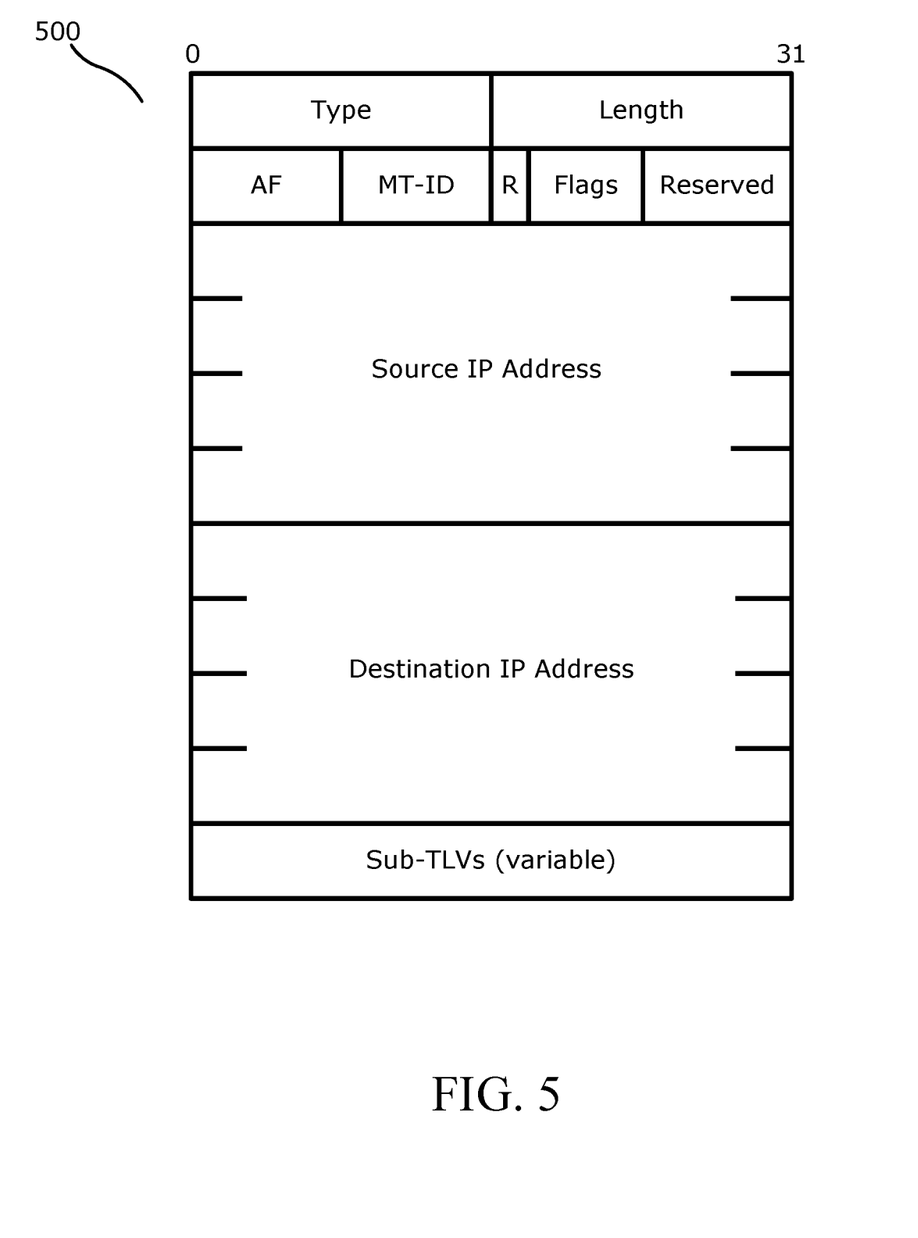
FIG. 5 shows the format for the OSPFv3 Pseudowire Association TLV.

For OSPFv3, the Pseudowire Association TLV advertises pseudowire association with the applicable sub-TLVs to represent the pseudowire, and is advertised as a new top level TLV of the E-Intra-Area-Prefix-LSA, the E-Inter-Area-Prefix-LSA, the E-AS-External-LSA, and the E-Type-7-LSA (defined in I-D.ietf-ospf-ospfv3-lsa-extend). Multiple OSPFv3 Extended Prefix Range TLVs may be advertised in these extended LSAs. The Pseudowire Association TLV should have at least one sub-TLV otherwise it will be ignored on receipt. The Pseudowire Association TLV may appear any number of times including none) within an LSA. FIG. 5 shows the format for OSPFv3 Pseudowire Association TLV 500, where Type is to-be-determined, Length is the number of bytes in the remainder of the TLV, AF is Address Family and is always 0 (IPv6 Unicast), R is the re-advertisement flag (the remainder should be set to 0 and are ignored) and is set when this TLV has been leaked from one level to another (upwards or downwards), and if bit 0 is set then it should not be leaked further, Flags (bits 1-7) of should be sent as 0 and are ignored upon receipt, Reserved should be reset on transmission and ignored on reception (reserved for future use), Source IP Address is the pseudowire association originator internet protocol (IP) address in network byte order (generally one of the loopback interface IP address of the originating router), Destination IP Address is the pseudowire association originator address in NBO (generally one of the loopback interface IP address of the destination router), and Sub-TLVs consisting of a two-byte sub-TLV type (requiring a new registry for this TLV) and a two-byte length of the remainder of the sub-TLV.

Figure 6:
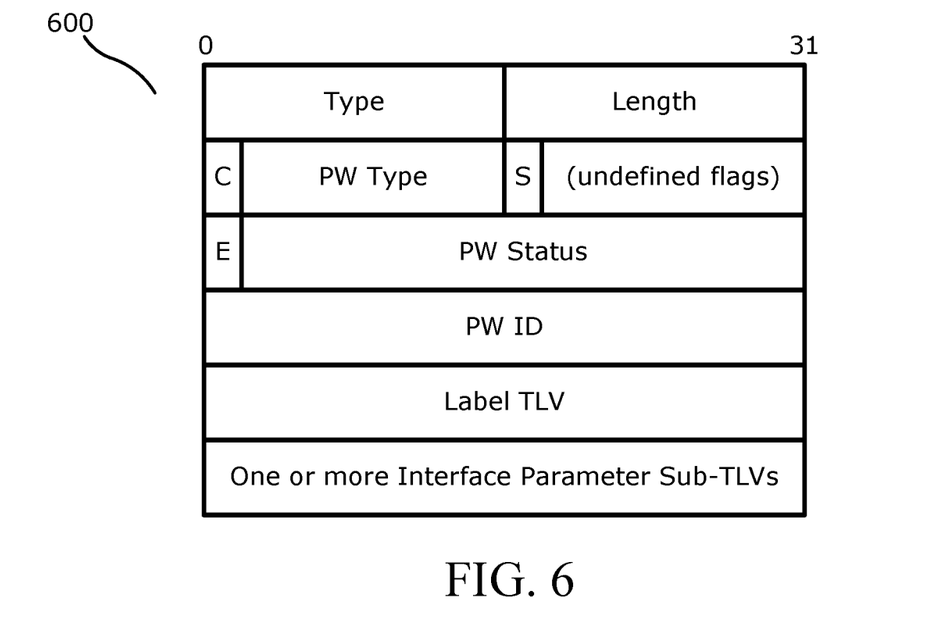
FIG. 6 shows the format for the Pseudowire Sub-TLV.

Pseudowire Sub-TLV. The Pseudowire Sub TLV can be used whenever both pseudowire endpoints have been provisioned. FIG. 6 shows the format for Pseudowire Sub TLV 600, where Type is to-be-determined, Length is the number of bytes in the remainder of the TLV, C is a control bit and is 0, PW Type is the type of pseudowire (as defined by the IANA), S is the 2-way pseudowire "seen" bit (described further in a later paragraph), E is the extended status bit (set when an Extended Status Sub-TLV is present with at least one bit set in the 128-bit extended status code, otherwise not set), PW Status indicates the status to remote peers for the indicated pseudowire and can have one or more bits set according to the masks shown in Table 1, PW ID is a non-zero 32-bit connection identifier that, together with the PW Type, identifies a particular pseudowire, Label TLV is an encoded label (as specified in RFC 5036 § 3.4.2), and the Interface Parameter Sub-TLVs is a variable-length TLV that is used to provide interface-specific parameters such as attachment circuit MTUs.

TABLE 1

| Bit Mask | Description |
| --- | --- |
| 0x00000000 | Pseudowire forwarding (clear all failures) |
| 0x00000001 | Pseudowire Not Forwarding |
| 0x00000002 | Local Attachment Circuit (ingress) Receive Fault |
| 0x00000004 | Local Attachment Circuit (egress) Transmit Fault |
| 0x00000008 | Local PSN-facing PW (ingress) Receive Fault |
| 0x00000010 | Local PSN-facing PW (egress) Transmit Fault |
| 0x00000020 | Illegal C-Bit |
| 0x00000040 | Wrong C-Bit |
| 0x00000080 | Incompatible bit-rate |
| 0x00000100 | CEP-TDM misconfiguration |
| 0x00000200 | Unassigned/Unrecognized TAI |
| 0x00000400 | Generic Misconfiguration Error |
| 0x00000800 | Label Withdraw with PW Status |

Figure 7:
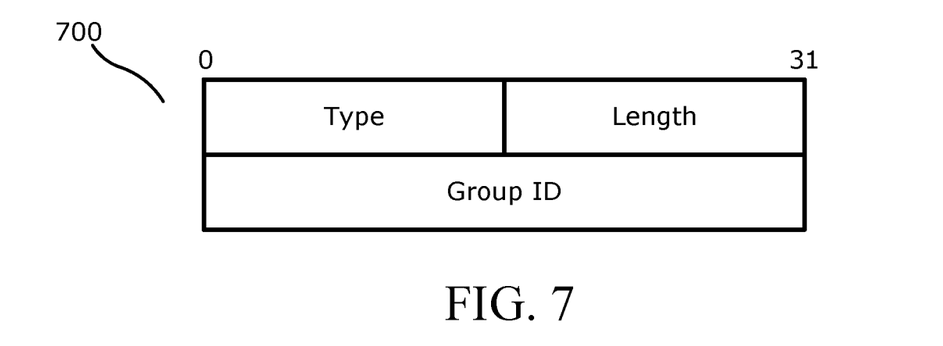
FIG. 7 shows the format for the Group ID Sub-TLV.

Group ID Sub-TLV. The Group ID Sub TLV identifies a group of pseudowires. FIG. 7 shows the format for Group ID Sub TLV 700, where Type is to-be-determined, Length is the number of bytes in the remainder of the TLV (4), and Group ID is arbitrary 32-bit value that represents a group of pseudowires and is, which is used to create groups in the pseudowire space.

Figure 8:
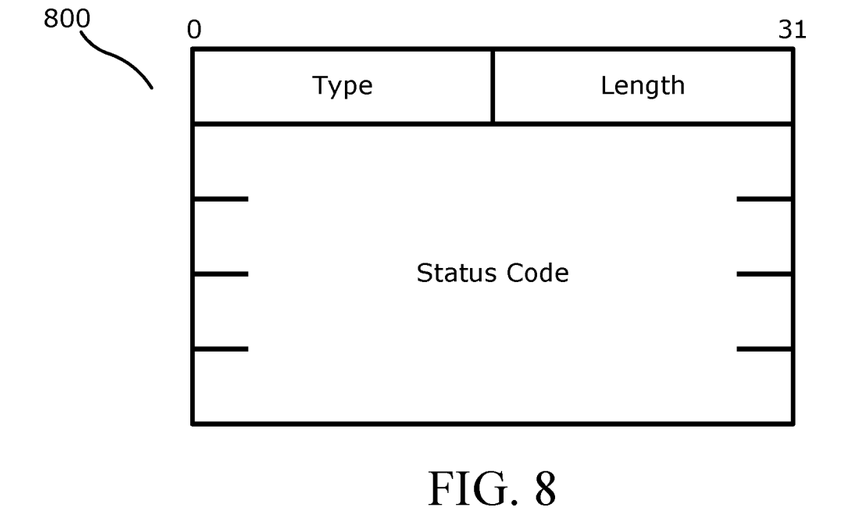
FIG. 8 shows the format of the Pseudowire Extended Status Sub-TLV.

Pseudowire Extended Status Sub-TLV. PE routers use the Pseudowire Extended Status Sub-TLV to indicate their extended status to their remote peers for a particular pseuedowire. FIG. 8 shows the format of Pseudowire Extended Status Sub-TLV 800, where Type is to-be-determined, Length is the number of bytes in the remainder of the TLV (always 12), and Status Code is a 128-bit field where each bit can be set or reset to indicate a particular failure. Pseudowire Extended Status Sub-TLV 800 should be advertised only if a Pseudowire Sub-TLV 600 has its E bit set and one of the Status Code bits is set. When the last status bit of this 128 bit field has been cleared, then this sub-TLV should not be present, and the E bit should be cleared. The Pseudowire Extended Status Sub-TLV is defined for future use, and none of the Status Codes are defined.

Figure 9:
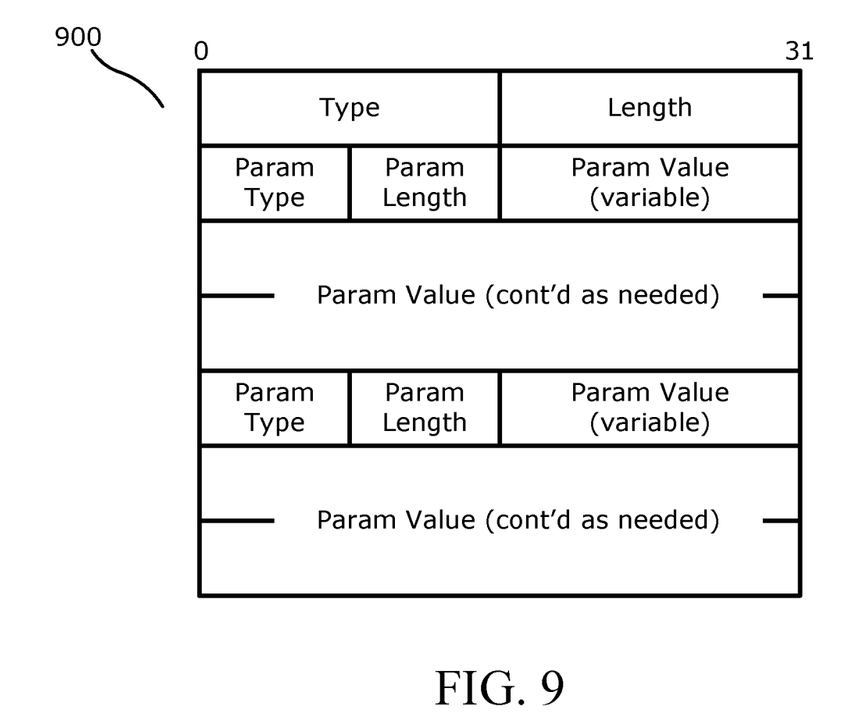
FIG. 9 shows the format of the Pseudowire Interface Parameters Sub-TLV.

Pseudowire Interface Parameters Sub-TLV. The Pseudowire Interface Parameters Sub-TLV specifies interface-specific parameters. When applicable, it is used to validate that the pseudowires and the ingress and egress ports at the edges of the circuit have the necessary capabilities to interoperate with each other. FIG. 9 shows the format of Pseudowire Interface Parameters Sub-TLV 900, where Type is to-be-determined, Length is the number of bytes in the remainder of the TLV, Param Type is the interface parameter type (defined by IANA), Param Length is the number of bytes of Param Value, Param Value is the parameter value itself (and continues into subsequent words where necessary). Param Type, Param Length, and Param Value may be repeated where necessary.

Figure 10:
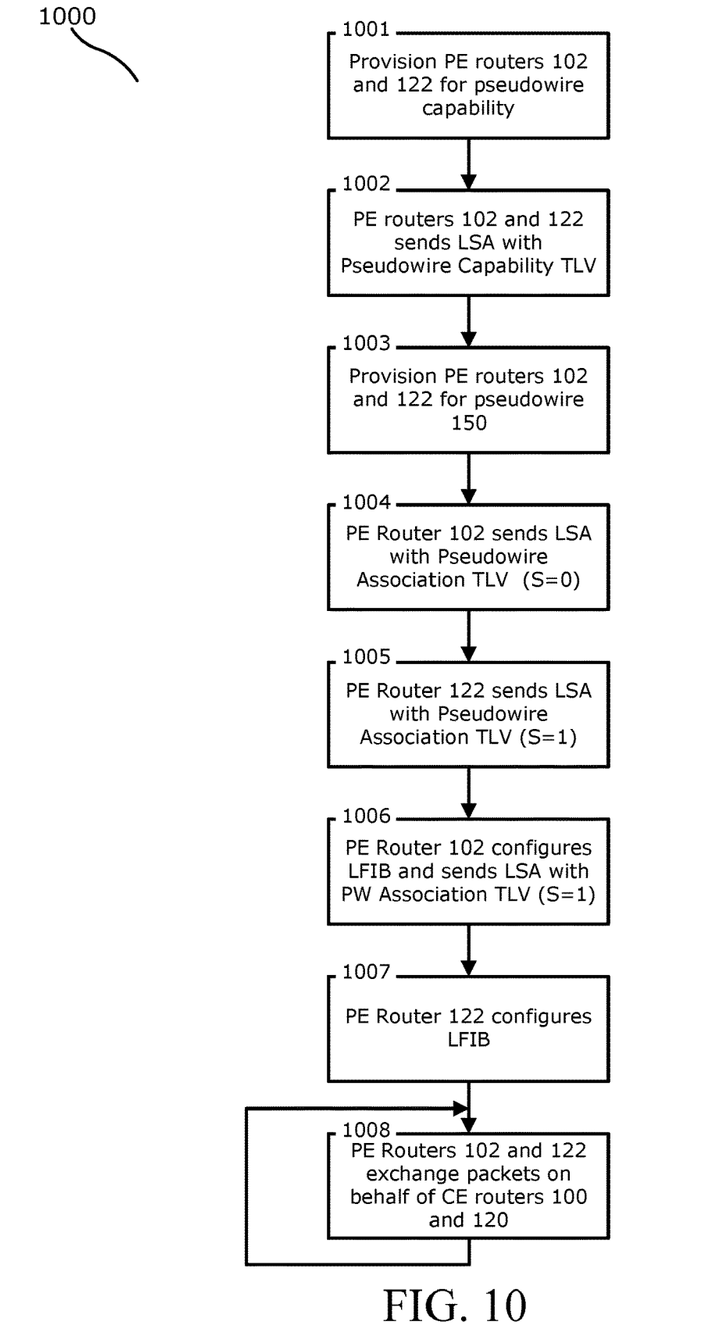
FIG. 10 shows a flowchart describing the creation of a pseudowire.

In an embodiment of this disclosure, an OSPFv2 pseudowire for emulating a frame relay link between is created according to the operations of flowchart 1000 shown in FIG. 10. For simplicity, the flowchart refers to the same network components identified in FIG. 1. Also, for simplicity, the descriptions of the operations refer to OSPFv2 LSAs and TLVs. As would be understood by one of ordinary skill in the context of this disclosure, the same sequence of steps would apply to an OSPFv3 configuration using OPSFv3 LSAs and TLVs.

In operation 1001, as with conventional pseudowire systems, the service provider operator provisions PE routers 102 and 122 to support pseudowires. The exact procedures for performing operation 1001 will be manufacturer-specific.

In operation 1002, PE router 102 creates a Router Information Opaque LSA with the Pseudowire Capability TLV. PE router 102 then floods PSN 130 with the Router Information Opaque LSA to inform the other routers, including PE router 122, that PE router 102 supports pseudowires. Upon receipt of the Router Information Opaque LSA, PE router 122 updates its AS topology database to show that PE router 102 supports pseudowires. In a similar fashion, PE router 122 creates and floods the AS with its own Router Information Opaque LSA to inform the other routers, including PE router 102, that PE Router 122 supports pseudowires.

In operation 1003, the service provider configures a pseudowire 150 between PE routers 102 and 122. By way of example and not limitation, this may begin with the service provider operator receiving a request from a customer needing an ATM connection between CE routers 110 and 120. In response, the service provider may enter configuration information on PE routers 102 and 122, such as IP addresses of the remote PE router, a pseudowire identifier (unique to the PE router), identification of the emulated service, a pseudowire label, and creation of routing instructions associating the pseudowire with CE routers 110 and 120. Provisioning of the pseudowire label is dependent on the emulated service. As defined by RFC 5036 § 3.4.2, ATM and Frame Relay links have specific label formats, while for some emulated services, the service provider operator may manually define a static pseudowire label, and for other emulated services, software on the PE router will allocate a pseudowire label dynamically.

In operation 1004, PE router 102 creates an Extended Prefix LSA with a Pseudowire Association TLV. The Pseudowire Association TLV has the source IP address of PE router 102 and the destination IP address of PE router 122. The Pseudowire Association TLV also has a Pseudowire Sub-TLV which includes a Pseudowire Type (in this case, indicating ATM emulation service), the assigned PW ID, a PW Status of 0, an S bit set to 0, and a label associated with the emulated service (in this case, an ATM label). PE router 102 then floods the AS with the Extended Prefix LSA to inform the other routers (including PE Router 122) that PE router 102 wants to establish pseudowire 150.

In operation 1005, PE router 122 receives the Extended Prefix LSA sent by PE router 102 in operation 1004. PE router 122 recognizes from the PW ID, PW Type, source IP, and destination IP that this pseudowire has been provisioned. In response, PE router 122 creates an Extended Prefix LSA with a comparable Pseudowire Association TLV except that it has the S bit set to 1 and its PW status of 0, and floods the AS with the Extended Prefix LSA.

In operation 1006, PE router 102 receives the Extended Prefix LSA sent by PE router 122 in operation 1005. PE router 102 recognizes that this Extended Prefix LSA is a response to its own earlier Extended Prefix LSA, and adds the pseudowire label to its label forwarding information base (LFIB) to associate the label with CE router 110. PE router 102 resends the Extended Prefix LSA except that it has set the S bit to 1.

In operation 1007, PE router 122 receives the Extended Prefix LSA sent by PE router 102 in operation 1006, and recognizes that the S bit is now 1. PE Router 122 adds the label to its label forwarding information base (LFIB) to associate the label with CE router 120. At this point, both PE routers 102 and 122 are ready to transmit and receive data over pseudowire 150.

In operation 1008, PE router 102 and PE router 122 begin exchanging messages in the conventional manner. That is, when PE router 102 gets a PDU in native format from CE router 110, it prepends a pseudowire label along with an MPLS label and sends into PSN 130. On the other end, PE router 122 strips off the pseudowire label and MPLS label and sends the PDU in native format on to CE 120 according to the pseudowire label—CE relationship stored in the LFIB.

Figure 11:
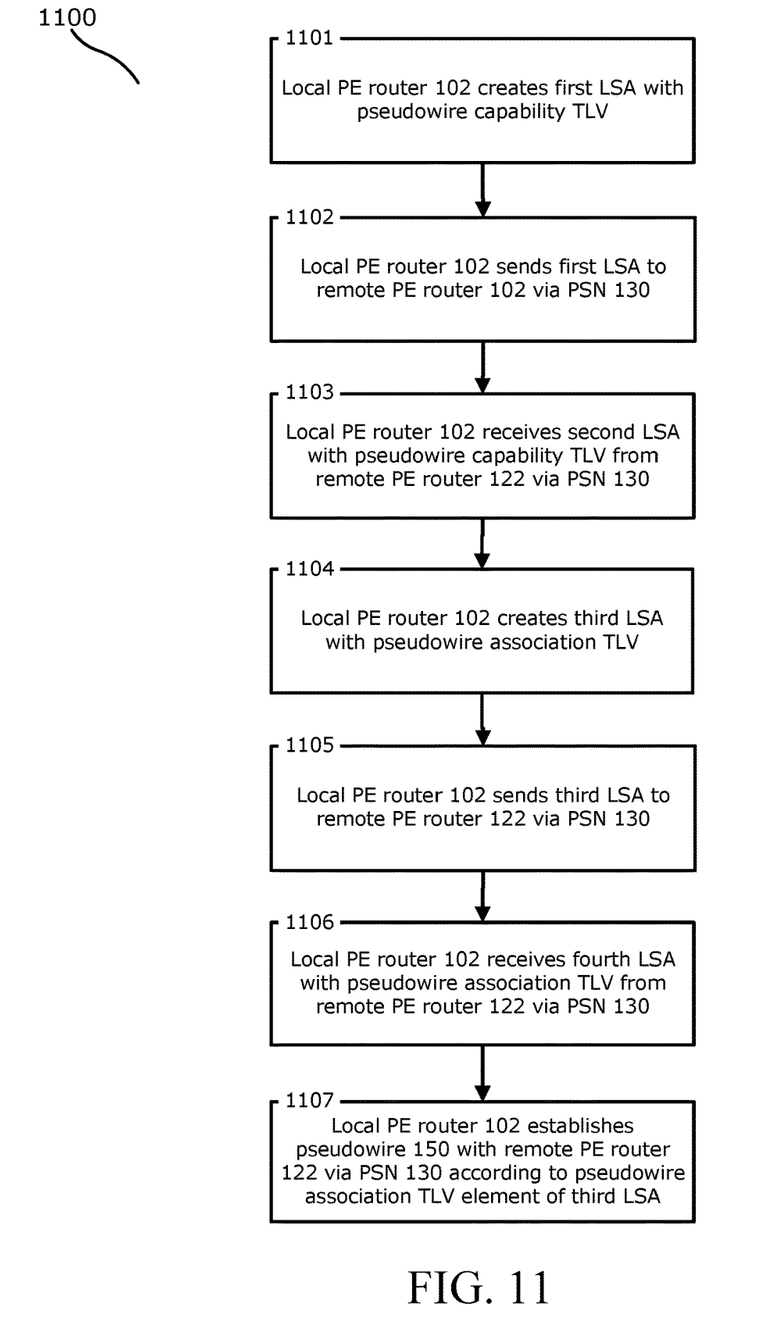
FIG. 11 shows a flowchart describing an embodiment of a local provider edge router establishing communications over a pseudowire.

In another embodiment, described in flowchart 1100 shown in FIG. 11, local PE router 102 establishes communications with remote PE router 122 via pseudowire 150 on a PSN 130. In this embodiment, local PE router 102 initiates pseudowire 150.

In operation 1101, local PE router 102 creates a first OSPF LSA comprising a Pseudowire Capability TLV. By way of example and not limitation, for OSPFv2, the first OSPF LSA may be a Router Information Opaque LSA, and for OSPFv3, the first OSPF LSA may be a Router Information LSA.

In operation 1102, local PE router 102 sends the first OSPF LSA to remote PE router 122 via a PSN 130 to inform remote PE router 122 that local PE router 102 supports pseudowires. Local PE router 102 may use a flooding mechanism to send the first OSPF LSA.

In operation 1103, local PE router 102 receives a second OSPF LSA from remote PE router 122 via PSN 130; the second OSPF LSA comprises a Pseudowire Capability TLV element. By way of example and not limitation, for OSPFv2, the second OSPF LSA may be a Router Information Opaque LSA, and for OSPFv3, the second OSPF LSA may be a Router Information LSA. Local PE router 102 learns, upon receipt of the second OSPF LSA, that remote PE router 122 supports pseudowires.

In operation 1104, local PE router 102 creates a third OSPF LSA; the third OSPF LSA comprises a Pseudowire Association TLV element. By way of example and not limitation, for OSPFv2, the third OSPF LSA may be an Extended Prefix LSA, and for OSPFv3, the third OSPF LSA may be an E-Intra-Area-Prefix-LSA, an E-Inter-Area-Prefix-LSA, an E-AS-External-LSA, or an E-Type-7-LSA. The Pseudowire Association TLV may have the source IP address of PE router 102 and the destination IP address of PE router 122. The Pseudowire Association TLV may also have a Pseudowire Sub-TLV which includes a Pseudowire Type (for example, an ATM emulation service), the assigned PW ID, a PW Status of 0, an S bit set to 0, and a label associated with the emulated service (for example, an ATM label).

In operation 1105, local PE router 102 sends the third OSPF LSA to remote PE router 122 via PSN 130 to indicate that local PE router 102 wants to establish a pseudowire connection with remote router 122. Local PE router 102 may use a flooding mechanism to send the third OSPF LSA.

In operation 1106, local PE router 102 receives a fourth OSPF LSA from remote PE router 122 via PSN 130; the fourth OSPF LSA comprises a Pseudowire Association TLV element. By way of example and not limitation, for OSPFv2, the fourth OSPF LSA may be an Extended Prefix LSA, and for OSPFv3, the fourth OSPF LSA may be an E-Intra-Area-Prefix-LSA, an E-Inter-Area-Prefix-LSA, an E-AS-External-LSA, or an E-Type-7-LSA. PE router 102 may recognize that this fourth OSPF LSA is a response to its third OSPF LSA, and may add the pseudowire label to its label forwarding information base (LFIB) to associate the label with CE router 110. PE router 102 may also resend the third OSPF LSA after changing the S bit to 1.

In operation 1107, local PE router 102 establishes a connection with remote PE router 122 via PSN 130 using pseudowire 150, according to the pseudowire association TLV element of the third OSPF LSA. Thereafter, PE router 102 and PE router 122 may exchange messages in the conventional manner.

Figure 12:
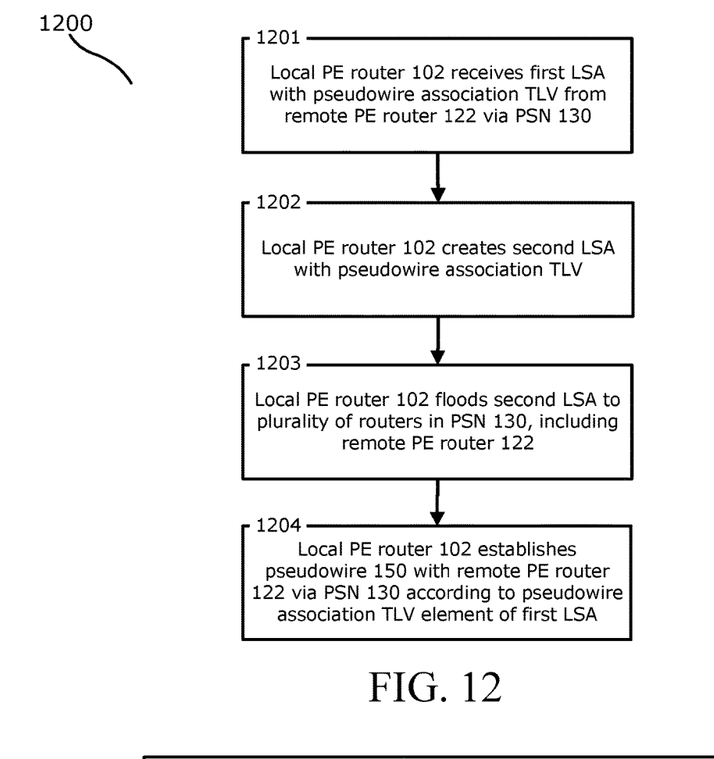
FIG. 12 shows a flowchart describing another embodiment of a local provider edge router establishing communications over a pseudowire.

In another embodiment, described in flowchart 1200 shown in FIG. 12, local PE router 102 establishes communication with remote PE router 122 via pseudowire 150 on PSN 130. In this embodiment, remote PE 122 initiates pseudowire 150.

In operation 1201, local PE router 102 receives a first OSPF LSA from remote PE router 122 via PSN 130; the first OSPF LSA comprises a Pseudowire Association TLV element. By way of example and not limitation, for OSPFv2, the first OSPF LSA may be an Extended Prefix LSA, and for OSPFv3, the first OSPF LSA may be an E-Intra-Area-Prefix-LSA, an E-Inter-Area-Prefix-LSA, an E-AS-External-LSA, or an E-Type-7-LSA. Local PE router 102 may recognize, from the PW ID, PW Type, source IP, and destination IP in the Pseudowire Association TLV, that this pseudowire has been provisioned.

In operation 1202, local PE router 102 creates a second OSPF LSA; the second OSPF LSA comprises a Pseudowire Association TLV element. The Pseudowire Association TLV may have the source IP address of PE router 102 and the destination IP address of PE router 122. The Pseudowire Association TLV may also have a Pseudowire Sub-TLV which includes a Pseudowire Type (for example, an ATM emulation service), the assigned PW ID, a PW Status of 0, an S bit set to 1, and a label associated with the emulated service (for example, an ATM label).

In operation 1203, local PE router 102 floods the second OSPF LSA to a plurality of routers in PSN 130, including remote PE router 122. This may indicate to remote PE router 122 that local PE router 102 is ready to establish pseudowire 150.

In operation 1204, local PE router 102 has established pseudowire 150 with remote PE router 122 via PSN 130 according to the pseudowire association TLV element of the first OSPF LSA. Thereafter, PE router 102 and PE router 122 may exchange messages in the conventional manner.

Figure 13:
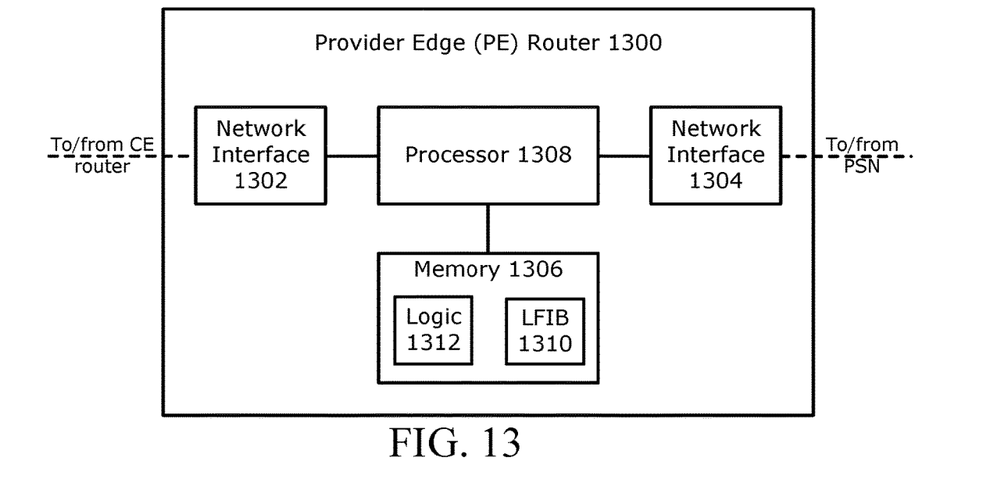
FIG. 13 shows a block diagram of a provider edge router suitable for implementing embodiments of the present disclosure.

FIG. 13 discloses a block diagram for a PE router 1300 that is suitable for implementing embodiments of the present disclosure. PE router 1300 includes a network interface 1302 configured to communicate with a CE router (not shown) and network interface 1304 configured to communicate with a PSN (not shown). By way of example and not limitation, network interface 1302 may be an Ethernet interface or any other interface suitable for connecting to other network components, and network interface 1304 may be a packet over SONET interface or any other interface suitable for connecting to a PSN; network interfaces 1302 and 1304 may be single port interfaces or multiport interfaces. PE router 1300 also includes processor 1308 for executing programs stored in local memory 1306. By way of example and not limitation, processor 1308 may be a central processing unit, a microcontroller, a digital signal processor, an application specific integrated circuit, combinations of any of the foregoing, or any other device suitable for execution of computer programs. By way of example, local memory 1306 may include LFIB 1310 for storing message forwarding information and logic 1312 for storing computer programs for implementing all or parts of flowcharts 1000, 1100, and/or 1200; local memory 1306 may also store other computer programs, configuration information, and other short-term and long-term data necessary for implementation of the embodiments of the present disclosure. By way of example and not limitation, local memory 1306 may be dynamic memory, static memory, disk drive(s), flash drive (s), combinations of any of the foregoing, or any other form of computer memory.

One of ordinary skill in the art will recognize a number of variations in the foregoing embodiment. For example, in some of the foregoing embodiments, the operations are described for OSPFv2 LSAs, however one of ordinary skill would understand that in an OSPFv3 network, the PE routers would use the OSPFv3 LSAs described earlier in this disclosure. Further, in the embodiment of FIG. 10, PE router 102 was characterized as originating the exchange of LSAs, however, one of ordinary skill would understand that either PE router could be characterized as the originator. Further, both PE routers could be sending out originating LSAs; this may alter the ordering of messages, but ultimately both PE routers will receive a Pseudowire Sub-TLV with the S bit set and pseudowire 150 will be ready for data transfer. Further, the format of the TLVs and Sub-TLVs can be varied to include additional information and/or omit other information, and the TLVs and Sub-TLVs could be associated with other OSPF LSAs than those listed in this disclosure. These variations are included here as examples and not limitations of the scope of the present disclosure.

In other embodiments of the present disclosure, an active pseudowire becomes inactive by withdrawing the pseudowire label. There are several variations on how this could occur. In one variation, a PE router sends a Router Information Opaque LSA (OSPFv2) or Router Information LSA (OSPFv3) without the Pseudowire Capability TLV advertising pseudowire capabilities. In another variation, a PE router sends a Pseudowire Association TLV with a non-zero value for the status (as shown in Table 1). In another variation, a PE router sends a Pseudowire Association TLV without a Pseudowire Sub-TLV. Note that after a label has been withdrawn by the output PE router and/or released by the input PE router, care should be taken not to advertise (re-use) the same released label until the output router can be reasonably certain that old packets containing the released label no longer persist in the MPLS-enabled network.

In other embodiments of the present disclosure, an operating pseudowire may become temporarily unavailable because of disruption in PSN 130 or disconnect of PE router 102 or 122 (because of equipment failure, device restart, in-service software upgrade, or other disruption). In such a case, a PE router may not be aware of the disruption to the pseudowire until it receives, for example, an LSA associated with pseudowire initialization. However, unlike conventional pseudowires configurations, no special resynchronization protocols are needed to restore the pseudowire.

In some embodiments of the present disclosure, both ends of a pseudowire (for example, both PE routers 102 and 122) may be simultaneously attempting to establish the pseudowire. In such a case, LSAs may cross paths with the value of the S bit of the Pseudowire Sub TLV of each LSA indicating the progress of the establishment of the pseudowire. By way of example, if the S bit of a Pseudowire Sub TLV from a local PE router and the S bit of a Pseudowire Sub TLV from a remote PE router are both 0, then neither PE router can send or receive data packets on the pseudowire. If the S bit of a Pseudowire Sub TLV from the local PE router is 1 and the S bit of a Pseudowire Sub TLV from a remote PE router is 0, this may indicate that the local PE router is ready to receive and has installed a pseudowire label in its LFIB, but it is still waiting for the remote PE router to indicate it is ready to receive. If the S bit of a Pseudowire Sub TLV from the local PE router is 0 and the S bit of a Pseudowire Sub TLV from a remote PE router is 1, this may indicate the reverse, namely that the remote PE router is ready to receive and has installed a pseudowire label in its LFIB, but it is still waiting for the local PE router to indicate it is ready to receive. Finally, if the S bit of a Pseudowire Sub TLV from the local PE router and the S bit of a Pseudowire Sub TLV from a remote PE router are both 1, then both ends are ready to receive and transmit.

Thus disclosed herein is a method for a local provider edge (PE) router to communicate over a pseudowire comprising a means for creating a first open shortest path first (OSPF) link state advertisement (LSA), wherein the first OSPF LSA comprises a pseudowire capability type-length-value (TLV) element, a means for sending the first OSPF LSA to a remote PE router via a packet switched network (PSN), a means for receiving a second OSPF LSA from the remote PE router via the PSN, wherein the second OSPF LSA comprises a pseudowire capability TLV element, a means for creating a third OSPF LSA, wherein the third OSPF LSA comprises a pseudowire association TLV element, a means for sending the third OSPF LSA to the remote PE router via the PSN, a means for receiving a fourth OSPF LSA from the remote PE router via the PSN, the fourth OSPF LSA comprising a pseudowire association TLV element, and a means for establishing a pseudowire connection with the remote PE router via the PSN according to the pseudowire association TLV element of the third OSPF LSA.

Further disclosed herein is a method for a local provider edge (PE) router to communicate over a pseudowire, comprising a means for receiving a first open shortest path first (OSPF) link state advertisement (LSA) from a remote PE router via a packet switched network (PSN), the first OSPF LSA comprising a pseudowire association type-length-value (TLV) element, a means creating a second OSPF LSA, wherein the second OSPF LSA comprises a pseudowire association TLV element, a means for flooding the second OSPF LSA to a plurality of routers in the PSN, wherein the remote PE router is one of the plurality of routers in the PSN, and a means for establishing a pseudowire connection with the remote PE router via the PSN according to the pseudowire association TLV element of the first OSPF LSA.

Further disclosed herein is a provider edge (PE) router comprising a means for communicating with a customer edge (CE) router, a means for communicating with a packet switched network (PSN), a means for storing a label forwarding information base (LFIB), a means for creating a first open shortest path first (OSPF) link state advertisement (LSA), wherein the first OSPF LSA comprises a pseudowire capability type-length-value (TLV) element, a means for sending the first OSPF LSA to a remote PE router via the second network interface, a means for receiving a second OSPF LSA from the remote PE router via the second network interface, wherein the second OSPF LSA comprises a pseudowire capability TLV element, a means for creating a third OSPF LSA, wherein the third OSPF LSA comprises a pseudowire association TLV element, a means for sending the third OSPF LSA to the remote PE router via the second network interface, a means for receiving a fourth OSPF LSA from the remote PE router via the second network interface, the fourth OSPF LSA comprising a pseudowire association TLV element, and a means for establishing a pseudowire connection with the remote PE router via the second network interface according to the pseudowire association TLV element of the third OSPF LSA.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for a local provider edge (PE) router to communicate over a pseudowire, the method comprising:
   creating a first open shortest path first (OSPF) link state advertisement (LSA), wherein the first OSPF LSA comprises a pseudowire capability type-length-value (TLV) element;
   sending the first OSPF LSA to a remote PE router via a packet switched network (PSN);
   receiving a second OSPF LSA from the remote PE router via the PSN, wherein the second OSPF LSA comprises a pseudowire capability TLV element;
   creating a third OSPF LSA, wherein the third OSPF LSA comprises a pseudowire association TLV element that includes an internet protocol (IP) address associated with the local PE router, an IP address associated with the remote PE router, and a pseudowire sub-TLV, the pseudowire sub-TLV containing a pseudowire type, a pseudowire identifier, a pseudowire label, and a seen (S) bit having a value of either 0 or 1;
   sending the third OSPF LSA to the remote PE router via the PSN;
   receiving a fourth OSPF LSA from the remote PE router via the PSN, wherein the fourth OSPF LSA comprises a pseudowire association TLV element; and
   establishing a pseudowire connection with the remote PE router via the PSN according to the pseudowire association TLV element of the third OSPF LSA.

2. The method of claim 1, wherein sending the first OSPF LSA comprises flooding the first OSPF LSA to a plurality of routers in the PSN, wherein sending the third OSPF LSA comprises flooding the third OSPF LSA to the plurality of routers in the PSN, and wherein the remote PE router is one of the plurality of routers in the PSN.

3. The method of claim 1, wherein the pseudowire capability TLV element of the first OSPF LSA comprises an indication that the local PE router supports pseudowires and wherein the pseudowire capability TLV element of the second OSPF LSA comprises an indication that the remote PE router supports pseudowires.

4. The method of claim 3, wherein the first OSPF LSA and the second OSPF LSA are router information opaque LSAs.

5. The method of claim 3, wherein the first OSPF LSA and the second OSPF LSA are router information LSAs.

6. The method of claim 1, wherein the third OSPF LSA and the fourth OSPF LSA are extended prefix LSAs.

7. The method of claim 1, wherein the third OSPF LSA and the fourth OSPF LSA are one of E-Intra-Area-Prefix-LSAs, E-Inter-Area-Prefix-LSAs, E-AS-External-LSAs, and E-Type-7-LSAs.

8. The method of claim 1, where after receipt of the fourth OSPF LSA, the method further comprises:
   creating a fifth OSPF LSA, wherein the fifth OSPF LSA comprises a pseudowire association TLV element and wherein the pseudowire association TLV element of the fifth OSPF LSA comprises:
   the IP address associated with the local PE router;
   the IP address associated with the remote PE router; and
   the pseudowire sub-TLV, the pseudowire sub-TLV including:
   the pseudowire type;
   the pseudowire identifier;
   the pseudowire label, and
   wherein the value of the S bit is 1; and
   sending the fifth OSPF LSA to the remote PE router via the packet switched network.

9. The method of claim 1, where after receipt of the fourth OSPF LSA, the method further comprises adding the pseudowire label to a label forwarding information base (LFIB) to associate the pseudowire label with a customer edge (CE) router.

10. The method of claim 9, wherein after establishing the pseudowire connection with the remote PE router, the method further comprises:
  receiving a first data packet from the remote PE router via the PSN, wherein the first data packet comprises the pseudowire label and a first payload;
  searching the LFIB to locate the CE router associated with the pseudowire label; and
  forwarding the first payload to the CE router associated with the pseudowire label.

11. The method of claim 10, wherein after establishing the pseudowire connection with the remote PE router, the method further comprises:
  receiving a second payload from the CE router;
  searching the LFIB to locate the pseudowire label associated with the CE router;
  prepending the pseudowire label to the second payload to form a second data packet; and
  sending the second data packet to the remote PE router via the PSN.

12. A method for a local provider edge (PE) router to communicate over a pseudowire, the method comprising:
  receiving a first open shortest path first (OSPF) link state advertisement (LSA) from a remote PE router via a packet switched network (PSN), wherein the first OSPF LSA comprises a pseudowire association type-length-value (TLV) element that includes an internet protocol (IP) address associated with the local PE router, an IP address associated with the remote PE router, and a pseudowire sub-TLV, the pseudowire sub-TLV containing a pseudowire type, a pseudowire identifier, and a pseudowire label;
  creating a second OSPF LSA, wherein the second OSPF LSA comprises a pseudowire association TLV element that includes the IP address associated with the local PE router, the IP address associated with the remote PE router, and the pseudowire sub-TLV, the pseudowire sub-TLV containing the pseudowire type, the pseudowire identifier, the pseudowire label, and a seen (S) bit having a value of 1;
  flooding the second OSPF LSA to a plurality of routers in the PSN, wherein the remote PE router is one of the plurality of routers in the PSN; and
  establishing a pseudowire connection with the remote PE router via the PSN according to the pseudowire association TLV element of the first OSPF LSA.

13. The method of claim 12, wherein after flooding the second OSPF LSA to the plurality of routers, the method further comprises adding the pseudowire label to a label forwarding information base (LFIB) to associate the pseudowire label with a customer edge (CE) router.

14. A local provider edge (PE) router comprising:
  a first network interface configured to communicate with a customer edge (CE) router;
  a second network interface configured to communicate with a packet switched network (PSN);
  a memory configured to store a label forwarding information base (LFIB),
  a processor coupled with the first network interface, the second network interface, and the memory, and wherein the processor is configured to:
    create a first open shortest path first (OSPF) link state advertisement (LSA), wherein the first OSPF LSA comprises a pseudowire capability type-length-value (TLV) element;
    send the first OSPF LSA to a remote PE router via the second network interface;
    receive a second OSPF LSA from the remote PE router via the second network interface, wherein the second OSPF LSA comprises a pseudowire capability TLV element;
    create a third OSPF LSA, wherein the third OSPF LSA comprises an internet protocol (IP) address associated with the local PE router, an IP address associated with the remote PE router, and a pseudowire association TLV element that includes a pseudowire type, a pseudowire identifier, a pseudowire label, and a pseudowire sub-TLV, the pseudowire sub-TLV containing a seen (S) bit having a value of 0;
    send the third OSPF LSA to the remote PE router via the second network interface;
    receive a fourth OSPF LSA from the remote PE router via the second network interface, the fourth OSPF LSA comprising a pseudowire association TLV element comprises the IP address associated with the local PE router, the IP address associated with the remote PE router, and the pseudowire sub-TLV, the pseudowire sub-TLV containing the S bit having a value of 1; and
    establish a pseudowire connection with the remote PE router via the second network interface according to the pseudowire association TLV element of the third OSPF LSA.

15. The local PE router of claim 14, wherein the processor is further configured to:
  add the pseudowire label to the LFIB to associate the pseudowire label with the CE router;
  receive a data packet from the remote PE router via the second network interface, wherein the data packet comprises the pseudowire label and a payload;
  search the LFIB to locate the CE router associated with the pseudowire label; and
  forward the payload to the CE router associated with the pseudowire label via the first network interface.

16. The local PE router of claim 14, wherein sending the first OSPF LSA comprises flooding the first OSPF LSA to a plurality of routers in the PSN via the second network interface, wherein sending the third OSPF LSA comprises flooding the third OSPF LSA to the plurality of routers in the PSN via the second network interface, and wherein the remote PE router is one of the plurality of routers in the PSN.

* * * * *